United States Patent
Kim et al.

(10) Patent No.: US 9,108,550 B2
(45) Date of Patent: Aug. 18, 2015

(54) HEADREST APPARATUS FOR MULTI-PURPOSE VEHICLE

(71) Applicants: Kia Motors Corp., Seoul (KR); DAE WON SAN UP CO., LTD, Ansan-si (KR)

(72) Inventors: Sang Ho Kim, Incheon (KR); Soo Hyun Moon, Hwaseong-si (KR); Deok Soo Lim, Hwaseong-si (KR); Jun Yeol Heo, Suwon-si (KR); Hyeong Jun Kim, Anyang-si (KR); Hyuk Kim, Ansan-si (KR); Jae Myung Hur, Seoul (KR); Do Kywn Kim, Seoul (KR)

(73) Assignees: KIA MOTORS CORP., Seoul (KR); DAE WON SAN UP CO., LTD., Ansan-Si (KR)

(*) Notice: Subject to any disclaimer, the term of this patent is extended or adjusted under 35 U.S.C. 154(b) by 0 days.

(21) Appl. No.: 14/071,501

(22) Filed: Nov. 4, 2013

(65) Prior Publication Data
US 2014/0339848 A1 Nov. 20, 2014

(30) Foreign Application Priority Data
May 15, 2013 (KR) .......... 10-2013-0054903

(51) Int. Cl.
*B60N 2/00* (2006.01)
*B60N 2/48* (2006.01)
*B60N 2/30* (2006.01)

(52) U.S. Cl.
CPC .......... *B60N 2/4873* (2013.01); *B60N 2/3011* (2013.01); *B60N 2/3065* (2013.01); *B60N 2/3079* (2013.01); *B60N 2002/4891* (2013.01)

(58) Field of Classification Search
CPC .. B60N 2/4811; B60N 2/4808; B60N 2/3065; B60N 2/3079; B60N 2002/4891
USPC .......... 296/66, 65.03, 65.09; 297/15, 378.12, 297/316, 326, 334, 335, 391, 410, 396
See application file for complete search history.

(56) References Cited

U.S. PATENT DOCUMENTS 5,195,795 A * 3/1993 Cannera et al. ............ 296/65.09

FOREIGN PATENT DOCUMENTS

| JP | 2004-262351 A | 9/2004 |
| JP | 2006-6720 A | 1/2006 |
| JP | 2007-106292 A | 4/2007 |
| JP | 2010-105655 A | 5/2010 |
| JP | 2012-116327 A | 6/2012 |
| KR | 10-2010-0025085 A | 3/2010 |

* cited by examiner

*Primary Examiner* — Joseph D Pape
(74) *Attorney, Agent, or Firm* — Morgan, Lewis & Bockius LLP

(57) ABSTRACT

A headrest apparatus for an MPV includes a headrest that can be automatically completely housed in a storage space in such a way as to slide without requiring a user to perform an additional operation of pushing the headrest downwards, thus being more convenient for the user. The headrest apparatus has a simple structure and a reduced size, thus reducing the weight of the vehicle. The headrest apparatus includes a headrest sliding unit, a sinking seat folding unit, and a seat support frame supporting a sinking seat on a floor of the MPV, wherein, when the sinking seat is housed in a seat storage space formed in the floor of the MPV, the upper surface of the sinking seat that is in a housed state is level with the upper surface of the floor of the MPV.

12 Claims, 7 Drawing Sheets

HEADREST APPARATUS FOR MULTI-PURPOSE VEHICLE

CROSS REFERENCE TO RELATED APPLICATION

The present application claims priority of Korean Patent Application Number 10-2013-0054903 filed May 15, 2013, the entire contents of which application is incorporated herein for all purposes by this reference.

BACKGROUND OF INVENTION

1. Field of Invention

The present invention relates generally to headrest apparatuses for MPVs (multi-purpose vehicles) and, more particularly, to a headrest apparatus for an MPV which is configured such that, when a rear row sinking seat enters a sinking mode, a headrest can be automatically completely housed in a storage space in such a way as to slide without requiring a user to perform an additional operation of pushing the headrest downwards, thus being more convenient for the user, and which has a simple structure, thereby having a reduced weight.

2. Description of Related Art

Generally, according to vehicle shape, vehicles are classified into passenger cars, which can carry a comparatively small number of people, buses, which can carry a large number of people, trucks, which transfer freight, and trailers, which carry large equipment, containers, etc.

Furthermore, there are high-occupancy vehicles (also referred to as one-box cars) in which a trunk and a passenger compartment are integrally formed. Recently, multi-purpose vehicles (hereinafter, referred to as 'MPVs'), which can carry large loads of equipment required in a variety of sports or leisure activities, are becoming more widely used. MPVs are typically configured such that a rear seat is folded to expand trunk space, thus making it possible to carry larger loads.

FIGS. 1A and 1B are perspective views showing an example of a method of housing a sinking seat in a seat storage space in an MPV according to a conventional technique.

FIGS. 2A and 2B are sectional views illustrating a process of completely housing the sinking seat of FIG. 1B in the seat storage space.

As shown in the drawings, a rearmost-row sinking seat 10 of vehicle seats includes a seat cushion 11 on which a passenger sits, a seatback 13 which supports the back of the passenger who is sitting on the seat cushion 11, and a headrest 15 which supports the head of the passenger. The sinking seat 10 may include left and right sinking seats which are integrally provided with each other.

The above-mentioned MPV has a three-row seat structure. The sinking seat 10 is disposed on the rearmost row, that is, the third row, and is configured such that it can be folded and housed in a seat storage space 60 formed in a floor of the MPV.

FIG. 1A illustrates a normal seating mode of the sinking seat 10 that is not folded. FIG. 1B illustrates the sinking seat 10 that is folded and housed in the seat storage space 60 of the MPV.

In the drawings, reference numerals 30 and 40 respectively denote a position of the sinking seat 50 when it is in the normal seating mode and a position thereof when it is housed in the seat storage space 60.

In the conventional MPV having the above-mentioned construction, as shown in FIGS. 2A and 2B, when the sinking seat 10 is housed in the seat storage space 60, the seat headrest 15 is placed on the seat cushion 11, thus making the seatback 13 protrude upwards from the upper surface of the floor 20, whereby a stepped portion is formed between the seatback 13 and the floor 20.

Therefore, to remove the stepped portion and make the seatback 13 level with the floor 20, an additional process of pushing the seatback 13 downwards is required, thus inconveniencing the user.

Furthermore, a headrest apparatus for inducing sliding of the headrest when the sinking seat 50 is completely housed in the storage space is comparatively complex and large, thus increasing the weight of the vehicle, and causing deterioration in quality.

Meanwhile, another prior design introduces a headrest apparatus having a seatback-interlocked front-back sliding function. In this prior art, the entirety of a headrest assembly is locked at a position, at which it has slid forwards from a seatback, thus satisfying a regulation value of a distance that the headrest protrudes forwards from the seatback. When the seat enters a sinking mode, the headrest that has been in the locked state is automatically released in conjunction with the folding operation of the seatback and then slides backwards. Therefore, the prior art makes the folding of the seatback smoother. However, in this prior art, the upper surface of the seatback is still not completely level with the floor when the sinking seat is housed in the storage space, thus requiring the user to push the seatback downwards. Also, the headrest apparatus is complex and large, thus increasing the weight of the vehicle, and deteriorating operation quality.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention has been made keeping in mind the above problems occurring in the prior art.

Various aspects of the present invention provide for a headrest apparatus for an MPV which is configured such that, when a sinking seat enters a sinking mode, a headrest can be automatically completely housed in a storage space in such a way as to slide without requiring a user to perform an additional operation of pushing the headrest downwards, thus being more convenient for the user.

Various aspects of the present invention provide for a headrest apparatus for an MPV which has a simple structure and a reduced size, thus reducing the weight of the vehicle and the production cost of the apparatus, and improving the operation quality.

Various aspects of the present invention provide for a seat headrest apparatus for an MPV, including: a headrest sliding unit; a sinking seat folding unit; and a seat support frame supporting a sinking seat on a floor of the MPV, wherein, when the sinking seat is housed in a seat storage space formed in the floor of the MPV, an upper surface of the sinking seat that is in a housed state is level with an upper surface of the floor of the MPV.

The headrest sliding unit may include: a cable extending out from the sinking seat folding unit; a frame housing installed in an upper portion of a seatback of the sinking seat; a locking bracket shaft provided in the frame housing; a locking bracket integrally provided on the locking bracket shaft; a headrest-support-pole connection pipe installed in the frame housing, the headrest-support-pole connection pipe sliding along a headrest sliding guide slot formed in the frame housing; a pulley unit provided on a first sidewall of the frame housing, the pulley unit inducing rotation of the locking bracket shaft depending on movement of the cable; and a spring provided on a side surface of the frame housing, the spring inducing sliding movement of the headrest-support-pole connection pipe.

The frame housing may have a U shape, and the locking bracket shaft and the headrest-support-pole connection pipe may be provided in an internal space defined by the U-shaped frame housing.

The first sidewall of the frame housing may have a double sidewall structure having an outer first-side frame and an inner first-side frame.

The headrest sliding guide slot may comprise headrest sliding guide slots respectively formed in the inner first-side frame and a second-side frame of the frame housing, the second-side frame having a single sidewall structure.

The spring may be fastened at a first end thereof to a fixed protrusion provided on the side surface of the frame housing, the spring being coupled at a second end thereof to an end of the headrest-support-pole connection pipe.

The locking bracket shaft may be coupled at a first end thereof to the pulley unit and coupled at a second end thereof to a second sidewall of the frame housing.

A rotation center portion formed in a medial portion of the locking bracket may protrude in one direction, and opposite ends of the locking bracket may curvedly extend from the rotation center portion to form wing parts, so that the locking bracket has a shape similar to a shape of a boomerang.

The locking bracket may be operated such that, when the locking bracket is rotated, the headrest-support-pole connection pipe is locked to or released from the opposite ends of the locking bracket lock.

The pulley unit may include a fixed pulley and a rotary pulley, wherein the rotary pulley is rotated by the cable that moves via the fixed pulley.

The rotary pulley may be coupled at an upper portion thereof to an end of the locking bracket shaft so that, when the rotary pulley is rotated, the locking bracket shaft is rotated along with the rotary pulley.

The locking bracket may comprise one or at least two locking brackets.

The sinking seat folding unit may include: a link bracket rotating when the sinking seat is folded; a cable connected at an end thereof to an end of the link bracket; and a stopper restricting the rotation of the link bracket within a predetermined range.

In the present invention, operation of sliding a headrest can be embodied by simplified structure. Thereby, the quality in the sliding operation of the headrest can be enhanced.

Furthermore, the headrest apparatus has a reduced size, thus reducing the weight of the vehicle. When the sinking seat enters a sinking mode, the seat that has been housed in a seat storage space is completely level with an upper surface of a floor of the vehicle without requiring a user to perform an additional operation of pushing the headrest downwards, thus being more convenient for the user.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1A:
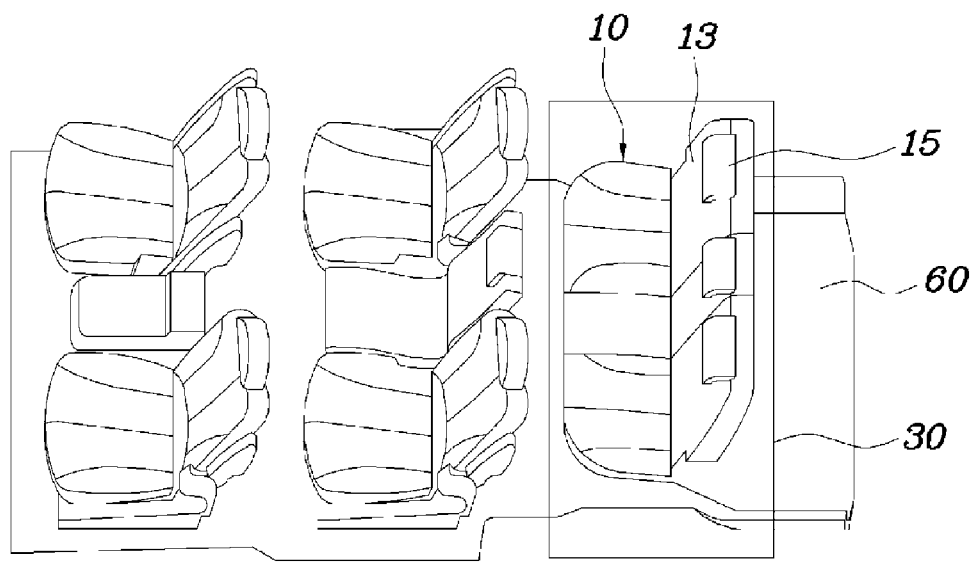
FIG. 1A is a perspective view illustrating an example of a sinking seat that is in a normal seating mode on a floor of a conventional MPV.
Figure 1B:
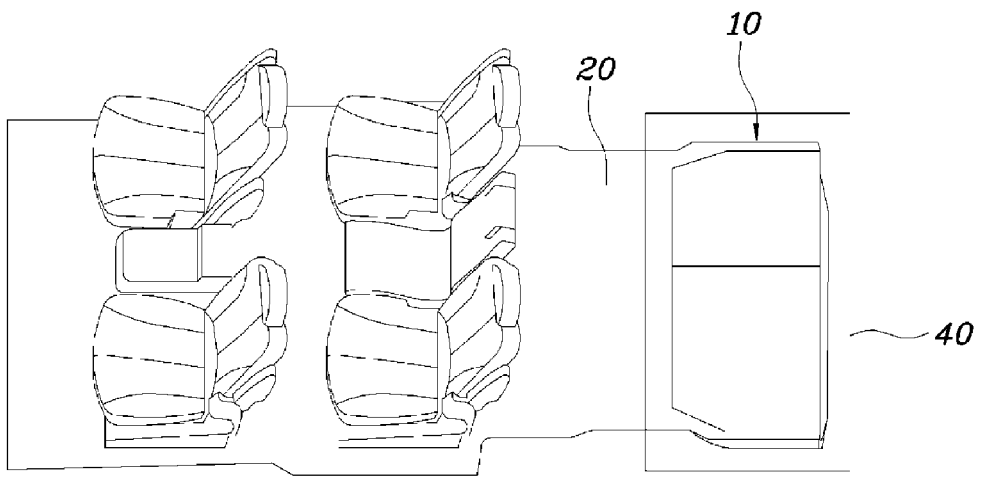
FIG. 1B is a perspective view illustrating an example of a sinking seat that is housed in a seat storage space formed in the floor of the conventional MPV.
Figure 2A:
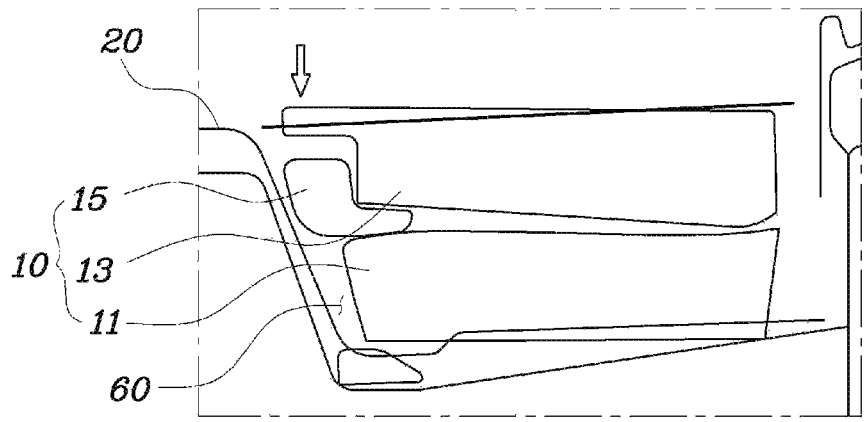
FIG. 2A is a sectional view showing an initial stage of a process of housing the sinking seat in the seat storage space of FIG. 1B.
Figure 2B:
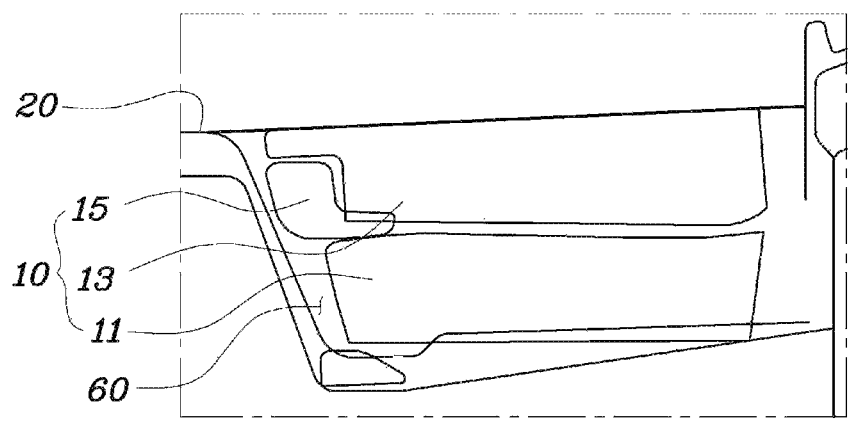
FIG. 2B is a sectional view showing a state in which the sinking seat is completely housed in the seat storage space of the floor by pushing downwards a seatback that has protruded in the state of FIG. 1B.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The shape and size of each illustrated element may be exaggeratedly expressed in the drawings for the sake of understanding the present invention.

Figure 3A:
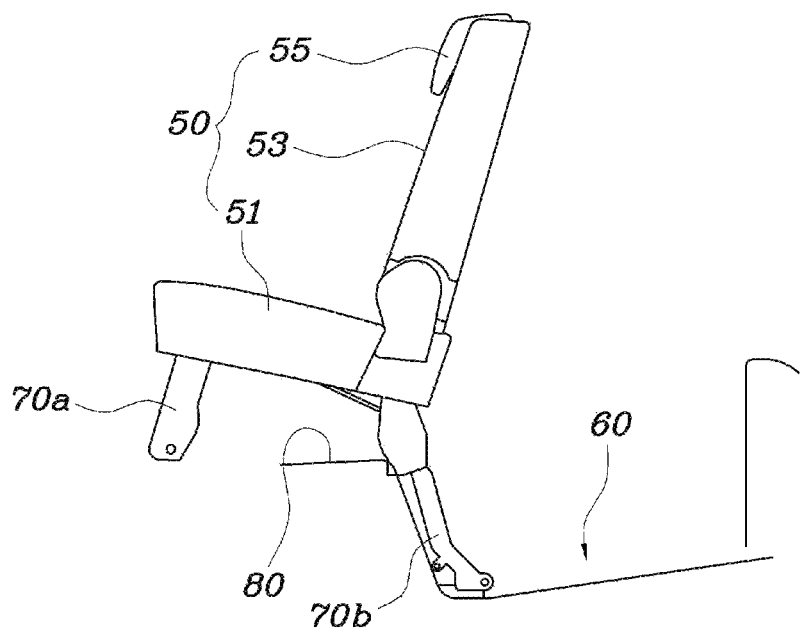
FIGS. 3A, 3B and 3C are views showing a process of folding an exemplary sinking seat of an MPV according to the present invention.
Figure 3B:
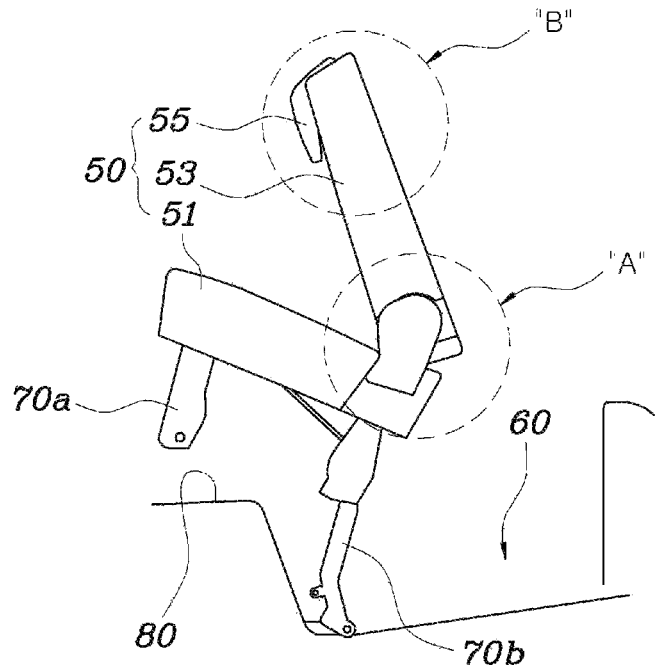
Figure 3C:
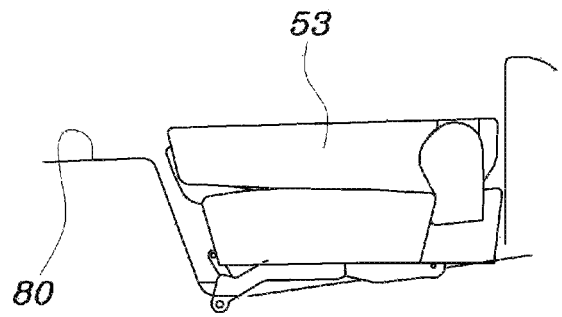

FIGS. 3A through 3C are views showing a process of folding the sinking seat of an MPV according to the present invention. FIG. 3A illustrates a normal seating mode of the sinking seat, FIG. 3B illustrates the sinking seat that is folded to a predetermined angle, for example, 35°, and FIG. 3C illustrates a storage mode of the sinking seat.

Referring to FIGS. 3A through 3C, the seat headrest apparatus for an MPV according to the present invention includes a sinking seat folding unit A, a headrest sliding unit B and a seat support frame 70 which supports the sinking seat on a floor of the vehicle. The present invention is configured such that, when the sinking seat 50 is housed in a seat storage space which is formed in the floor behind the sinking seat 50, an upper surface of the sinking seat that is in the housed state or position is level with an upper surface of the floor of the vehicle.

In the seat headrest apparatus according to the present invention, when the sinking seat 50 is in the normal seating mode (FIG. 3A), the sinking seat 50 is supported by the seat support frame 70 on the floor 80 of the vehicle, and a seatback 53 is maintained upright. Subsequently, when the sinking seat 50 enters the sinking mode (FIG. 3B), a back folding process of folding the seatback 53 onto the seat cushion 51 to a predetermined angle begins. At this time, a front seat support frame 70a of the seat support frame 70 is lifted upwards, while a rear seat support frame 70b is rotated around a lower hinge point.

In FIG. 3B, reference character A denotes the sinking seat folding unit and shows a portion on which the seatback 53 is folded onto the seat cushion 51. Reference character B denotes the headrest sliding unit in which the headrest provided on an upper end of the seatback 53 slides.

Figure 4:
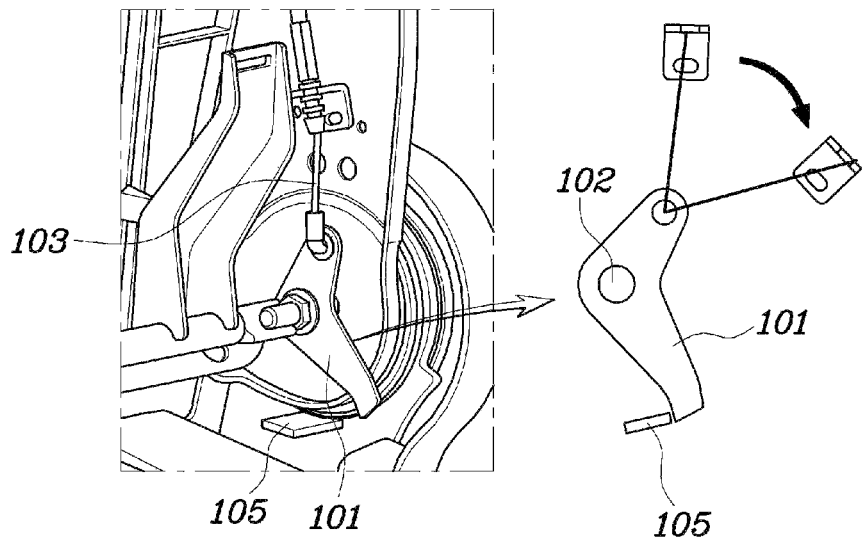
FIG. 4 is a view showing the internal construction of portion A of FIG. 3B.

FIG. 4 is a view showing the internal construction of portion A of FIG. 3B.

Figure 5:
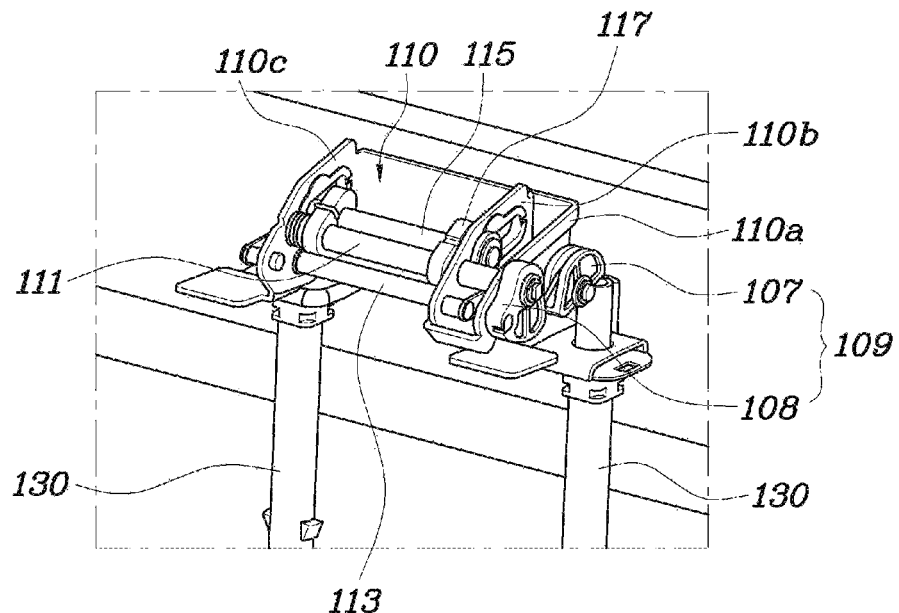
FIG. 5 is a view showing the internal construction of portion B of FIG. 3B.

FIG. 5 is a view showing the internal construction of portion B of FIG. 3B to illustrate the improved construction of the seat headrest apparatus of the present invention.

Referring to FIG. 4, when the back folding of the sinking seat 50 begins, as shown in FIG. 3B, a link bracket 101 rotates and thus pulls a cable 103 which is connected at a first end thereof to an upper end of the link bracket 101. Here, the link bracket 101 that has been rotated to a predetermined angle is stopped by a stopper 105 which is disposed below the link bracket 101.

Referring to FIG. 5, in the seat headrest apparatus according to the present invention, when the back folding of the sinking seat 50 is carried out, associated elements are operated in conjunction with the operation of pulling the cable 103, whereby the seat headrest automatically slides such that, when the sinking seat 50 is completely housed in the seat storage space 60 formed in the floor of the vehicle, the surface of the seatback 53 that is exposed at the top thereof to the outside is level with the upper surface of the floor 80 of the vehicle.

Figure 6A:
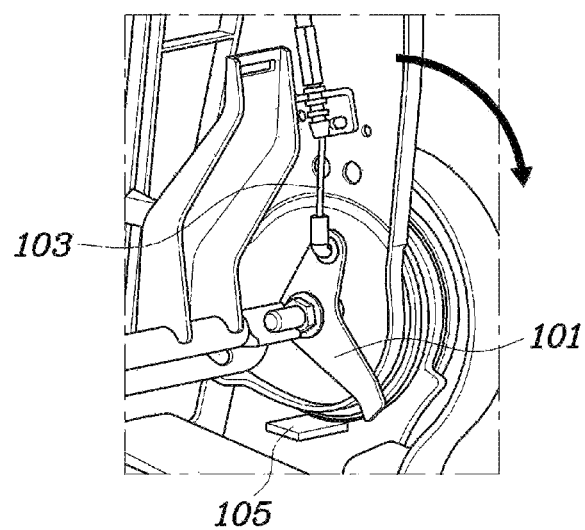
FIGS. 6A, 6B, 6C, 6D and 6E are views stages of the operation of a headrest apparatus of the MPV vehicle during the process of folding the sinking seat, according to the present invention.
Figure 6B:
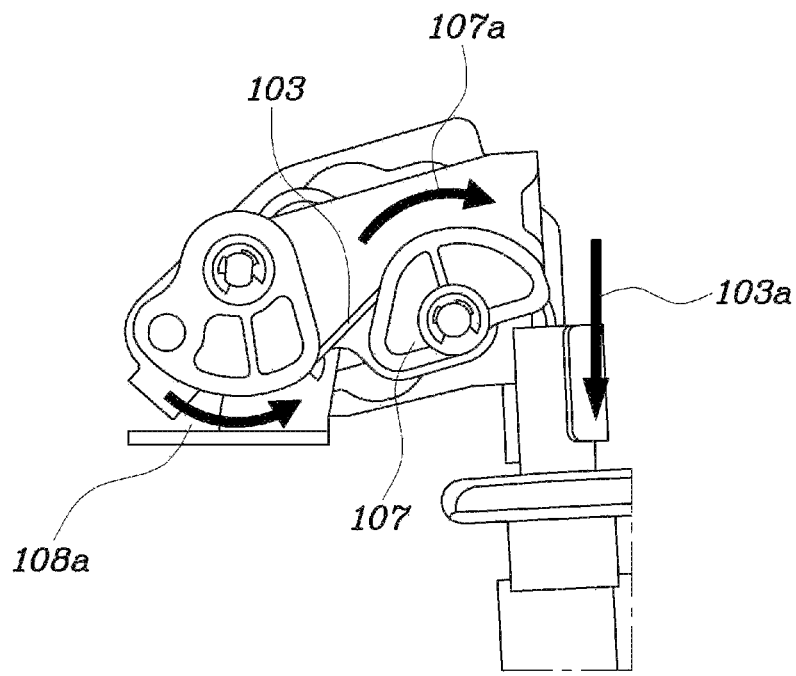
Figure 6C:
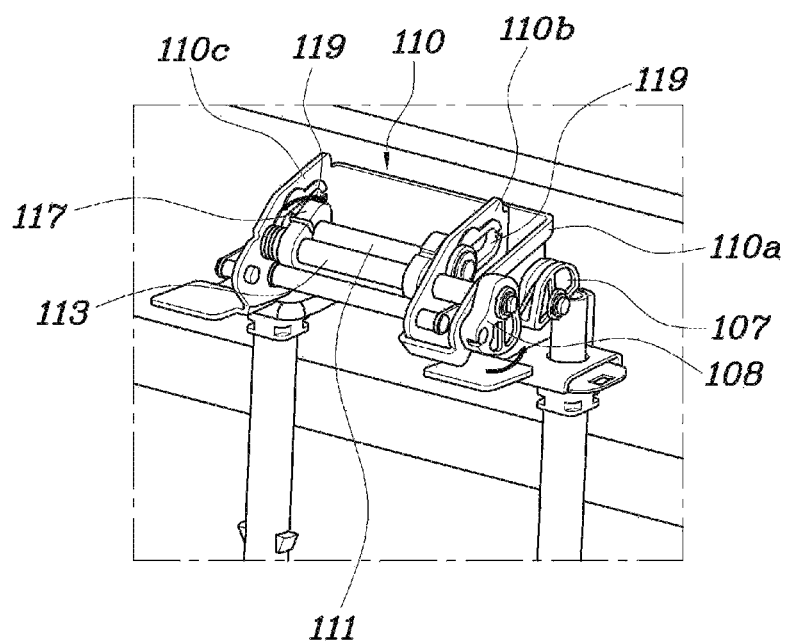
Figure 6D:
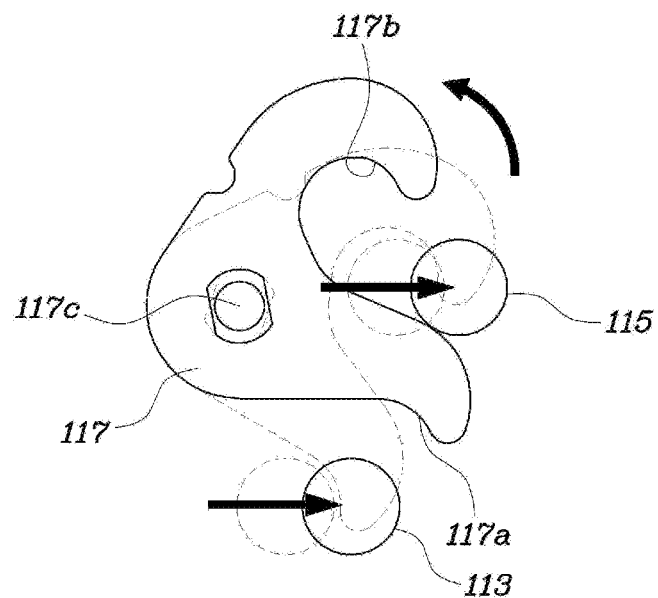
Figure 6E:
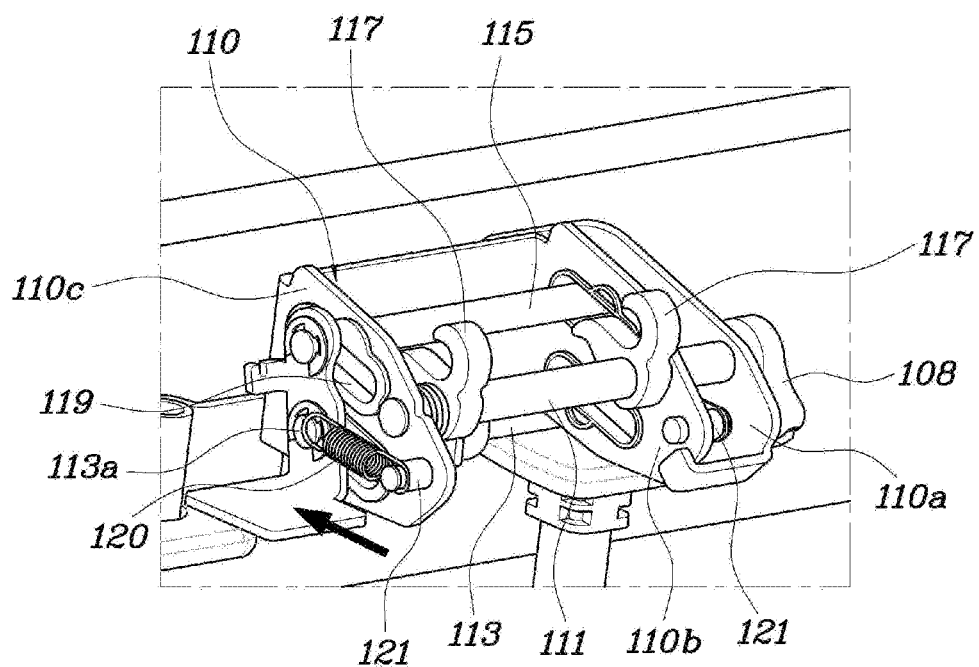

In detail, as shown in FIGS. 5 and 6E, the seat headrest apparatus for MPVs according to the present invention includes: a frame housing 110 which is installed in an upper portion of the seatback 53 of the sinking seat 50; a locking bracket shaft 111 which is provided in the frame housing 110; a locking bracket 117 which is integrally provided on the locking bracket shaft 111; headrest-support-pole connection pipes 113 and 115 which are installed in the frame housing 110 and are slid by the locking bracket 117 along headrest sliding guide slots 119 formed in the frame housing 110; a pulley unit 109 which is provided on a predetermined portion of the frame housing 110 and guides rotation of the locking bracket shaft 111; and springs 120 which are provided on side surfaces of the frame housing 110 and guide movement of the headrest-support-pole connection pipes 113 and 115. One will appreciate that such integral components may be monolithically formed.

Furthermore, a seat headrest 55 is coupled to upper ends of headrest support poles 130. The headrest-support-pole connection pipes 113 and 115 are connected to the headrest support poles 130. Depending on movement of the headrest-support-pole connection pipes 113 and 115, the headrest 55 slides along the frame housing 110 within a predetermined range.

As shown in FIGS. 5, 6C and 6E, the frame housing 110 has an approximate U shape when viewed from the plan view. The locking bracket shaft 111 and the headrest-support-pole connection pipes 113 and 115 are installed in an internal space defined by the U-shaped frame housing 110. Here, the locking bracket shaft 111 is spaced apart from the headrest-support-pole connection pipes 113 and 115 by predetermined distances. A predetermined portion, for example, a rotation center portion (117c of FIG. 6D), of the locking bracket 117 is coupled on the locking bracket shaft 111.

A first end of the locking bracket shaft 111 protrudes outwards from a first side surface of the frame housing 110 and is connected to the pulley unit 109 so that the locking bracket shaft 111 is rotated by the operation of the pulley unit 109. A second end of the locking bracket shaft 111 is rotatably coupled to a second side surface of the frame housing 110.

As shown in FIG. 6D, the rotation center portion 117c of the locking bracket 117 protrudes in one direction, and opposite ends thereof extend from the rotation center portion 117c upwards and downwards in such a way as to have curved shapes. Thus, the locking bracket 117 generally has a shape similar to that of a boomerang. The opposite curved ends 117a and 117b of the locking bracket 117 make contact with the headrest-support-pole connection pipes 113 and 115, thus forming a locking state in which sliding movement of the headrest-support-pole connection pipes 113 and 115 on the frame housing 110 is restricted. When the locking bracket 117 is rotated from the locking state, the locking bracket 117 release the headrest-support-pole connection pipes 113 and 115, thus allowing them to slide relative to the frame housing 110.

Furthermore, although two locking brackets 117 have been illustrated as being provided on the locking bracket shaft 111, a single or more than two locking brackets 117 may be provided.

The pulley unit 109 includes two pulleys, one of which is a fixed pulley 107, and the other of which is a rotary pulley 108. For reference, the number of pulleys in the pulley unit 109 may be one or more than two.

In the sinking mode in which the sinking seat 50 is back-folded, the link bracket (101 of FIG. 6A) of the sinking seat folding unit (A of FIG. 3B) is rotated, and the cable 103 connected to the link bracket 101 is pulled in a direction (downwards, that is, the direction designated by the arrow of FIG. 6B) corresponding to the direction in which the link bracket 101. As shown in FIG. 6B, the cable 103 extends from the link bracket 101 upwards and is connected to the rotary pulley 108 via the fixed pulley 107. Thus, when the cable 103 is pulled downwards, the rotary pulley 108 is rotated.

Furthermore, a portion, for example, an upper portion, of the rotary pulley 108 is connected to the corresponding end of the locking bracket shaft 111 so that, when the rotary pulley 108 is rotated, the locking bracket shaft 111 is also rotated.

As shown in FIG. 6E, the frame housing 110 is configured such that the first side surface thereof in which the pulley unit 109 is disposed has a double sidewall structure. The double sidewall structure of the frame housing 110 includes an outer first-side frame 110a and an inner first-side frame 110b. The inner and outer first-side frames 110a and 110b are spaced apart from each other by a predetermined distance so that the internal space is defined therebetween.

One of the headrest sliding guide slots 119 is formed in the inner first-side frame 110b disposed at the first side of the frame housing 110, while the other headrest sliding guide slot 119 is formed in a sidewall frame 110c which has a single sidewall structure and is disposed at the second side of the frame housing 110.

The locking brackets 117 are disposed in the internal space of the frame housing 110 that is formed opposite to the rotary pulley unit 109 based on the inner first-side frame 110b of the frame housing 110. In other words, the locking brackets 117 are disposed between the inner first-side frame 110b and the second-side frame 110c of the frame housing 110. In addition, the locking brackets 117 are respectively disposed on opposite ends of the locking bracket shaft 111.

The springs 120 are respectively provided on an outer surface of the inner first-side frame 110b of the double sidewall structure of the frame housing 110 and an outer surface of the second-side frame 110c. As shown in FIG. 6E, a first end of each spring 120 is fastened to a fixed protrusion 121 that is provided on the corresponding side frame 110b, 110c, and a second end of the spring 120 is coupled to the corresponding ends of the headrest-support-pole connection pipes 113 and 115 which are slidably provided. In the drawings, the end of the headrest-support-pole connection pipe 113 that is disposed at the second side of the frame housing 110b is designated by reference numeral 113a.

During the back-folding process of the sinking seat 50, as the headrest-support-pole connection pipes 113 and 115 move, the springs 120 are extended so that tensile force is applied to the headrest-support-pole connection pipes 113 and 115. When the sinking seat 50 is converted from the storage mode, in which the sinking process of the sinking seat 50 has been completed, into the original normal seating mode, the headrest-support-pole connection pipes 113 and 115 are automatically returned to their original positions by the restoring force of the springs 120.

The operation of the seat headrest apparatus for MPVs according to the present invention having the above-mentioned construction will be described below.

FIGS. 6A through 6E are views stages of the process of folding the sinking seat provided with the seat headrest apparatus according to the present invention.

Referring to FIG. 6A, when the process of folding the sinking seat 50 from the normal seating mode to the sinking mode begins, as shown in FIGS. 3A and 3B, the link bracket 101 of the sinking seat folding unit (portion A of FIG. 3B) is rotated so that the cable 103 connected to the link bracket 101 is pulled downwards. As the folding process of the sinking seat 50 is conducted, the angle to which the link bracket 101 is rotated is gradually increased. Thereby, the length to which the cable 103 is pulled is also increased. The link bracket 101 which has been rotated to a predetermined angle is stopped by the stopper 105 which is provided below the link bracket 101, whereby the link bracket 101 cannot rotate to more than the predetermined angle.

Referring to FIG. 6B, when the cable 103 is pulled by the rotation of the link bracket 101, the rotary pulley 108, to which the first end of the cable 103 is connected, is rotated. Here, to make the rotation of the rotary pulley 108 smooth, the fixed pulley 107 is provided in such a way that the cable 103 can move over the fixed pulley 107.

In FIG. 6B, reference numeral 103a denotes the arrow which indicates the direction in which the cable 103 moves. Reference numeral 107a denotes the arrow which indicates the direction in which the cable 103 moves on the fixed pulley 107. Reference numeral 108a denotes the arrow which indicates the direction in which the rotary pulley 108 is rotated by the movement of the cable 103.

Referring to FIGS. 6C and 6D, when the rotary pulley 108 rotates, the locking bracket shaft 111 which is integrally connected to the rotary pulley 108 is rotated. When the locking bracket shaft 111 rotates, the locking brackets 117 which are coupled to the locking bracket shaft 111 are also rotated. As such, when the locking brackets 117 rotate, the headrest-support-pole connection pipes 113 and 115 which have been in the locked state are released from the opposite curved ends 117a and 117b of the locking brackets 117 and are able to move. In this state, the headrest-support-pole connection pipes 113 and 115 moves along the headrest sliding guide slots 119 formed in the frame housing 110. One will appreciate that such integral components may be monolithically formed.

Meanwhile, when the sinking seat 50 is converted from the sinking mode, in which it is in the completely folded state, into the normal seating mode again, the headrest-support-pole connection pipes 113 and 115 are automatically returned to their original positions by the elastic force of the springs 120 which are provided on the side surfaces of the frame housing 110, whereby the seat headrest 55 is also automatically returned to its original position.

FIG. 6D is a view illustrating the above-mentioned operation of the locking brackets 117. In the initial stage, each locking bracket 117 is disposed at a position designated by the dotted line. In detail, the opposite curved ends 117a and 117b of the locking bracket 117 make contact with the headrest-support-pole connection pipes 113 and 115, thus restricting the headrest-support-pole connection pipes 113 and 115 from moving.

When the locking bracket 117 is rotated around the rotation center portion 117c (in a counterclockwise direction based on the drawing), the headrest-support-pole connection pipes 113 and 115 which have been in the locked state are released from the locking bracket 117, thus entering the movable state. In the drawing, the locking bracket 117 that has been rotated from the locked state is designated by the solid line.

Referring to FIG. 6E, as the headrest-support-pole connection pipes 113 and 115 move along the headrest sliding guide slots 119 of the frame housing 110, the sliding function of the headrest is conducted. Here, the springs 120 which are connected to the ends of the headrest-support-pole connection pipes 113 and 115 make it possible for the headrest-support-pole connection pipes 113 and 115 to be automatically moved along the headrest sliding guide slots 119 when the sinking seat 50 is converted into the normal seating mode again.

As described above, the present invention provides a more simple structure to a headrest apparatus which embodies the sliding operation of a headrest-support-pole connection pipe, on which a headrest is mounted, in a sinking mode of a seat. Therefore, it becomes easy to use, problems in the quality of a sliding operation of the headrest are reduced, and the manufacturing process is simplified, thus reducing the production cost.

Furthermore, the size of the headrest sliding apparatus is reduced, whereby the weight of the vehicle can also be reduced. Moreover, when the sinking seat enters the sinking mode, the seat which is inserted into a storage space formed in a floor of the vehicle automatically becomes level with an upper surface of the floor, thus not requiring a user to perform an additional operation of completely pushing the seat into the storage space. Therefore, the present invention is more convenient for the user.

For convenience in explanation and accurate definition in the appended claims, the terms upper or downward, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inven-

What is claimed is:

1. A seat headrest apparatus for a multi-purpose vehicle (MPV), comprising:
   a headrest sliding unit;
   a sinking seat folding unit; and
   a seat support frame supporting a sinking seat on a floor of the MPV,
   wherein the headrest sliding unit comprises:
      a cable extending out from the sinking seat folding unit;
      a frame housing installed in an upper portion of a seat-back of the sinking seat;
      a locking bracket shaft provided in the frame housing;
      a locking bracket integrally provided on the locking bracket shaft;
      a headrest-support-pole connection pipe installed in the frame housing, the headrest-support-pole connection pipe sliding along a headrest sliding guide slot formed in the frame housing;
      a pulley unit provided on a first sidewall of the frame housing, the pulley unit inducing rotation of the locking bracket shaft depending on movement of the cable; and
      a spring provided on a side surface of the frame housing, the spring inducing sliding movement of the headrest-support-pole connection pipe.

2. The seat headrest apparatus as set forth in claim 1, wherein the frame housing is U-shaped, and the locking bracket shaft and the headrest-support-pole connection pipe are provided in an internal space defined by the U-shaped frame housing.

3. The seat headrest apparatus as set forth in claim 1, wherein the first sidewall of the frame housing comprises a double sidewall structure having an outer first-side frame and an inner first-side frame.

4. The seat headrest apparatus as set forth in claim 1, wherein the headrest sliding guide slot comprises headrest sliding guide slots respectively formed in the inner first-side frame and a second-side frame of the frame housing, the second-side frame having a single sidewall structure.

5. The seat headrest apparatus as set forth in claim 1, wherein the spring is fastened at a first end thereof to a fixed protrusion provided on the side surface of the frame housing, the spring being coupled at a second end thereof to an end of the headrest-support-pole connection pipe.

6. The seat headrest apparatus as set forth in claim 1, wherein the locking bracket shaft is coupled at a first end thereof to the pulley unit and coupled at a second end thereof to a second sidewall of the frame housing.

7. The seat headrest apparatus as set forth in claim 1, wherein a rotation center portion formed in a medial portion of the locking bracket protrudes in one direction, and opposite ends of the locking bracket curvedly extend from the rotation center portion to form wing parts, so that the locking bracket has a boomerang shape.

8. The seat headrest apparatus as set forth in claim 7, wherein the locking bracket is operated such that, when the locking bracket is rotated, the headrest-support-pole connection pipe is locked to or released from the opposite ends of the locking bracket lock.

9. The seat headrest apparatus as set forth in claim 1, wherein the pulley unit comprises a fixed pulley and a rotary pulley, wherein the rotary pulley is rotated by the cable that moves via the fixed pulley.

10. The seat headrest apparatus as set forth in claim 9, wherein the rotary pulley is coupled at an upper portion thereof to an end of the locking bracket shaft so that, when the rotary pulley is rotated, the locking bracket shaft is rotated along with the rotary pulley.

11. The seat headrest apparatus as set forth in claim 1, wherein the locking bracket comprises at least two locking brackets.

12. The seat headrest apparatus as set forth in claim 1, wherein the sinking seat folding unit comprises:
   a link bracket rotating when the sinking seat is folded;
   a cable connected at an end thereof to an end of the link bracket; and
   a stopper restricting the rotation of the link bracket within a predetermined range.

* * * * *